United States Patent Office 3,050,497
Patented Aug. 21, 1962

3,050,497
IMPROVED HIGH MOLECULAR WEIGHT POLYISOBUTYLENE COMPOSITIONS AND METHOD OF MAKING
David W. Young, Homewood, Ill., assignor, by mesne assignments, to Sinclair Research, Inc., New York, N.Y., a corporation of Delaware
No Drawing. Filed Mar. 15, 1961, Ser. No. 95,817
4 Claims. (Cl. 260—45.5)

My invention relates to compositions of matter comprising polyisobutylene containing a particular type of polyethylene in particular amounts and a method for their preparation.

Polyisobutylene with a molecular weight of from about 1,000 to 5,000 is an oil. The polyisobutylene with a molecular weight of from about 5,000 to 18,000 is of a consistency similar to chewing gum and the polyisobutylene of molecular weight of about 18,000 to 40,000 is a semi-solid, tacky, plastic mass. The polyisobutylene with a molecular weight of from about 40,000 to 100,000 is a tacky elastic solid that has cold flow properties. The polyisobutylene of about 100,000 to 300,000 molecular weight is a rubber-like, strong elastic polymer of low tackiness, with no cold flow properties at room temperature. The high molecular weight product with 300,000 molecular weight, for example, has a tensile strength of about 1,000 to 1,500 pounds per square inch. This high molecular weight polyisobutylene is, however, difficult to mold, extrude or calender because of its nerve.

Polyethylene has been admixed with polyisobutylene to produce products having certain advantageous properties of the homopolymers. The prior art has taught that a relatively large proportion of the polyethylene, i.e. at least 40 percent, must be present to produce products of improved properties.

I have found, however, contrary to the teaching of the prior art that large proportions of polyethylene should be present in polyisobutylene to provide products of advantageous properties, that as little as about 1 or 1.5 to 4.5 weight percent of "low-pressure" polyethylene of a molecular weight of at least about 20,000, based on the total composition, incorporated into polyisobutylene of a molecular weight of at least about 100,000 surprisingly improves the physical properties of the solid polyisobutylene. The small amount of polyethylene reduces the nerve of the polyisobutylene so that the material can be processed to form improved products for wire insulation, sheeting, paper coatings and packages for food, catalysts, carbon black, etc. The polyethylene also reduces the volume swell of finished products when the blends of polyisobutylene and polyethylene are extruded and thus the blends will extrude to dye specifications. Also, the tackiness of the polyisobutylene is reduced and tensile strength is improved.

As described above, the polyisobutylene that is improved by my invention has a molecular weight of at least about 100,000, and preferably at least about 180,000 to as high as 300,000 or more. By the term molecular weight as used herein, I mean the molecular weight values obtained by determining the intrinsic viscosity and finding the molecular weight by reference to the Harris correlation graph [J. Pol. Sci., 8,361 (1952)]. The polyisobutylene can be prepared by known methods as, for example, by the methods disclosed in U.S. Patents 2,130,507 and 2,426,820. The polymerization is carried out at about −10° C. to −100° C. by contacting the cooled olefin with a Friedel-Crafts type catalyst. Preferably, the polymers of isobutylene are made by the use of $AlCl_3$ or $BF_3$ as a catalyst. The amount of catalyst used is about 0.02 to 0.25, preferably 0.05, percent by weight of the olefin. A preferred diluent for the olefin is methyl chloride and the amount of methyl chloride is preferably held at about 2 volumes to one volume of isobutylene. The temperature of the olefin in the methyl chloride is held at about −78° C. to −103° C. After the olefin is polymerized it is washed with water and dried. An antioxidant, such as 2,6-di-t-butylphenol, in a concentration of about 0.1 to 0.25 percent can be added to the polymer, if desired.

The polyethylene useful in my compositions is the so-called "low-pressure" polyethylene. By this term I mean polyethylene which may be produced by the use of pressures not exceeding about 1,000 p.s.i. as distinguished from the so-called high-pressure polyethylene prepared by the high-pressure method wherein the pressures range from about 500 up to 1,000 atmospheres or more and free radical producing catalysts such as benzoyl peroxide are used. The useful "low-pressure" polyethylenes have a molecular weight of at least about 20,000. Low-pressure polyethylenes having molecular weights in the range of about 20,000 to 1,000,000, preferably about 30,000 to 300,000 and more preferably about 30,000 to 200,000, can be added to the polyisobutylene in this invention.

"Low-pressure" polyethylene is a term which has been adopted by the art to describe ethylene polymer, generally made under low-pressure conditions, which is substantially linear and has almost no branched chains as compared to high pressure polyethylene which has a highly branched structure. Generally, the low-pressure polyethylene contains no more than 5 branched methyl groups while high-pressure polyethylene contains at least about 50 branched groups. The low-pressure polyethylene is highly crystalline and correspondingly dense as compared to the less crystalline and less dense high-pressure polyethylene. Generally, the low-pressure polyethylene has a density of at least about 0.94 as compared to a density of about 0.92 for high-pressure polyethylene and the former may have a density up to about 0.97.

Thus the density may be used to characterize the ethylene polymer used in this invention. This density may be, for example, in the range of about 0.958 to 0.965. Also, the low-pressure polyethylene is more rigid, has a higher softening point, has a higher tensile strength, lower elongation and lower impact strength than high-pressure polyethylene. Also, it is markedly superior to high-pressure polyethylene in chemical resistance.

A useful low-pressure polyethylene is "Marlex 50," a commercially available polymer manufactured by the Phillips Petroleum Company. The properties of this polymer are described in detail and compared with those of high-pressure polyethylene in papers entitled "Molecular Structure of Marlex Polymers" by D. C. Smith and "Properties of Marlex 50 Ethylene Polymer" by R. Vernon Jones and P. J. Boeke, published by the Division of Petroleum Chemistry, American Chemical Society, General Papers, Preprints, volume 1, No. 1, February 1956, pages 219–239.

The following table adapted from the above described papers (pages 220 and 226) shows the differences in properties of a high-pressure polyethylene and two typical "low-pressure" polyethylenes.

| | H.P.[1] | L.P. (A)[2] | L.P. (B)[3] |
|---|---|---|---|
| Unsaturation: Double bonds/1,000 C. atoms | 0.6 | 0.7 | 1.5 |
| Branching—Methyl groups/1,000 C. atoms: | | | |
| Total | 21.5 | 3 | <1.5 |
| Terminal | 4.6 | [4](−2) | [4](<1.5) |
| Methyl branches | [4](2.5) | | |
| Ethyl branches | 14.4 | 1 | <1 |
| Crystallinity, Percent: | | | |
| X-ray diffraction | 64 | 87 | 93 |
| Nuclear resonance | 65 | 84 | 93 |
| Crystallite size (A.) | 190 | 360 | 390 |
| Density | 0.92 | | 0.96 |
| Tensile strength, p.s.i. (ASTM D412-51) | 1,800-2,000 | | 4,000-4,500 |
| Elongation, Percent (ASTM D412-51) | 400-600 | | 20-30 |
| Impact Strength, (IZOD) ft. lbs./inch (ASTM D356-47T) | >16 | | 3.0 |
| Stiffness, p.s.i. (ASTM D747-50) | 25,000 | | 140,000 |
| Compressive strength, p.s.i. (ASTM D695-52T) | 400-600 | | 2,400 |
| Deformation under load, Percent (122° F., 100 p.s.i.) (ASTM D621-51T) | 5 | | 0 |
| Heat distortion temp., ° F. (66 p.s.i.) (ASTM D648-45T) | 110-115 | | 165-175 |
| Brittleness temp., ° F. (ASTM 746-52T) | −112 | | <−186 |
| Hardness, Shore "D" (ASTM 676-49T) | 51-53 | | 68-70 |

[1] "DNYH", a conventional commercial high-pressure polyethylene.
[2] "Super Dylan", a low-pressure polyethylene made by the process of Belgian Patent 533,362 to Ziegler.
[3] "Marlex 50", a commercial low-pressure polyethylene made by the Phillips Petroleum Co.
[4] Assumed.

A more general comparison is found in the following table adapted from FIGURE 1 of the above described Jones and Boeke paper (page 235).

| | A | C | D |
|---|---|---|---|
| Density | 0.92-0.93 | 0.94-0.95 | 0.96 |
| Crystallinity, percent | 65 | 85 | 95 |
| Relative rigidity | 1 | 3 | 4 |
| Softening temp., ° F | 220 | 255 | 260 |
| Tensile strength | 2,000 | 3,500 | 5,500 |
| Elongation | 500 | 100 | 20 |
| Impact strength | 10 | 4 | 3 |

NOTE.—A=Typical high-pressure polyethylene. C=Typical Ziegler polymers. D=Marlex 50 polymer.

The low-pressure polyethylene is produced by the use of particular catalysts.

In the Ziegler process, the preferred catalysts are alkyl aluminum compounds or complexes of alkyl aluminum compounds. More generally, the useful catalysts in this process are compounds having reducing properties such as the above or mixtures of such compounds and a reducible compound of a heavy metal. The catalysts include the hydrides, alkyl or aryl derivatives of the metals aluminum, gallium, indium, beryllium, or zinc; their complexes with organic compounds, e.g. with ethers, thioethers, amines, thiophenols, carboxylic acids and sulfonic acids; or in complex linkage with alkali or alkaline earth metal hydrides, alkyls or aryls, e.g. sodium aluminum tetraphenyl. Also, the alloys or hydrides of alkali metals or alkaline earth metals are useful. Also, complex compounds of the hydrides of these metals with aluminum hydride, boron hydride, alkyl or aryl borides, alkyl or aryl esters of boric acid are effective. Examples are aluminum trimethyl, aluminum triphenyl, gallium trimethyl, indium trimethyl and beryllium diphenyl. Also, halogen derivatives of the aluminum alkyls or aryls are useful, particularly the mono halides. Improvements can be obtained by adding small quantities of nickel, cobalt or platinum to the aluminum trialkyl.

The reducible heavy metal compound which can be used with the above metal compounds and complexes is that of a metal of groups 4, 6 and 8 of the periodic table. For example, titanium, zirconium, hafnium, thorium, uranium, vanadium, columbium, tantalum, chromium, molybdenum and tungsten are useful. The preferred metals are titanium, zirconium, thorium, uranium and chromium. Also, iron, cobalt and nickel and manganese are useful. The preferred salts of the metals are the halides, oxyhalides, complex halides (e.g. fluorides), freshly precipitated oxides or hydroxides, alkoxides, acetates, benzoates or acetonylacetonate. The preferred salts of titanium or zirconium are the tetrachloride, oxychloride or the acetonylacetonate.

The process is carried out by heating ethylene to about −50° to 250° C., and preferably about 20° to 100° C., in the presence of the catalyst. Pressures can vary from about 1 to 70 atmospheres and preferably about 1 to 10. Advantageously, diluents are used to provide workable reaction mixtures. An example of the production of a low-pressure polyethylene is as follows. Ethylene at 1 liter per minute was passed into stirred n-heptane containing a catalyst prepared by mixing 0.5 g. of aluminum triethyl in 5 moles n-heptane and 0.8 g. of titanium tetrachloride in 80 ml. n-heptane and pouring into 300 ml. of n-heptane. Halfway through the preparation, which took 70 minutes, another 300 ml. of n-heptane was added. The n-heptane was purified by passing through silica gel and storing over sodium wire. Isopropyl alcohol (99%) was added, the mixture stirred until all the polymer particles changed from brown to white. This mixture was then filtered and washed thoroughly with more isopropyl alcohol. After drying in a vacuum oven at 70° C. overnight, the yield was 48 g. of polymer, softening at 131° C. and melting at 144° C. It had an intrinsic viscosity of 1.70 corresponding to a molecular weight of 70,000.

The above catalysts and the process are described in Belgian Patents 533,362; 534,792; 534,888; 538,782; and 527,736.

Another process utilizes as catalysts solid oxides of group VA and VIA metals, alone or supported on a difficultly reducible metal compound. Alkali and alkaline earth metals; alkali and alkaline earth metal hydrides; alkali metal borohydrides; borohydrides of magnesium, beryllium, aluminum, thorium, hafnium, zirconium and uranium; alkali and alkaline earth metal carbides; and alkali metal-aluminum hydride complexes are used with the catalysts as activators. Oxides of chromium, molybdenum, tungsten, uranium, vanadium, niobium, and tantalum can be used. Also, salts of these metals can be used such as cobalt, chromium, magnesium, calcium, zinc, nickel or copper salts of chromic, tungstic, uranic, vanadic, niobic and tantalic acids. As supports, metal oxides such as gamma-alumina, titania and zirconia are useful. Advantageously, before or during polymerization, the oxides are treated with an agent with strong reducing powers, e.g. hydrogen. The reaction is conducted in a high boiling solvent under low pressures, e.g. 500 p.s.i., and temperatures of about 100° to 350° C. Advantageously, a small amount of anhydrous hydrogen halide or alkyl halide can be added. This process is described in U.S. Patents 2,691,647; 2,692,258; 2,692,259; 2,700,663; 2,702,288; 2,710,854; 2,725,374; 2,726,231; 2,728,758; 2,726,234; 2,731,452; and 2,731,453. Also, catalysts of nickel, cobalt or mixtures thereof on activated carbon and advantageously with alkali metal hydrides or metal borohydrides are useful as described in U.S. Patents 2,658,059; 2,692,-261; 2,692,295; 2,717,888; and 2,717,889.

Another process, believed to be the one by which the above-described "Marlex 50" is produced, utilizes as a catalyst chromium oxide on a silica-alumina carrier prepared by impregnating a finely dispersed silica-alumina mixture with a chromium oxide or compound which is transformed to an oxide by calcination in air, and drying and activating by treatment with air at 400° to 800° C. for 3 to 10 hours or more. The temperature of polymerization is generally about 65° to 232° C. Inert hydrocarbon solvents are used. Pressures are preferably about 100 to 500 p.s.i. or more. The process is described in Belgian Patent 530,617 and in a paper entitled "Marlex Catalyst Systems" by Alfred Clark, J. P. Hogan, R. L. Banks, and W. C. Lanning, published by The Division of Petroleum Chemistry, American Chemical Society, General Papers, Preprints, volume 1, No. 1, February 1956, pages 211-217.

The compositions of my invention can also contain materials such as fillers, e.g. clay, carbon black, and wax, and also anti-oxidants and dyes and other components which do not affect the basic characteristic of the compositions.

The polyisobutylene-polyethylene compositions of my invention are prepared by admixture of the two ingredients. For example, the compositions can be prepared by heating the polyisobutylene in a mill and adding the polyethylene to the heated polyisobutylene and milling until the two ingredients form a homogeneous mixture. I have found also that the ethylene polymer can be formed in a solution of the polyisobutylene, thus providing a particularly advantageous method for producing the compositions of my invention. In this procedure, the polyisobutylene and a catalyst such as described above, e.g., aluminum triethyl-titanium tetrachloride, are dissolved in an inert organic liquid solvent, such as heptane, and then the ethylene is added as it is when no polyisobutylene is present as described above to form the ethylene polymer with the polyisobutylene in solution. At the end of the run, some alcohol is added to precipitate the polyisobutylene and the polyethylene, and the solvent removed by filtration. If a small amount of alcohol is added at the end of the run, then the heptane can be removed from the polyisobutylene and polyethylene by evaporation under reduced pressure. The catalyst is one effective to catalyze the polymerization of ethylene under mild conditions such as about −50° to 350° C. and up to about 1,000 p.s.i.

Polyisobutylene products containing various amounts of polyethylene were tested for physical properties. The polyisobutylene had a molecular weight of 260,000 and the polyethylene was the "Marlex 50" product whose preparation is described above having a molecular weight of 70,000. The results are tabulated below.

COMPOSITION

| Polyethylene, percent | 0 | 2 | 3 | 4 | 5 | 10 |
|---|---|---|---|---|---|---|
| Polyisobutylene, percent | 100 | 98 | 97 | 96 | 95 | 90 |

PROPERTIES

| | | | | | | |
|---|---|---|---|---|---|---|
| Tensile, lbs./sq. inch[1] | 1,500 | 2,200 | 2,700 | 2,800 | 1,600 | 1,310 |
| Elongation, percent[1] | 910 | 880 | 870 | 870 | 905 | 945 |
| Modulus at 400% elongation[1] | 100 | 180 | 190 | 200 | 180 | 180 |
| Tear resistance, p.s.i. (ASTM-D624-44) | 140 | 160 | 180 | 190 | 180 | 100 |

[1] As determined by tests made on a Model L-3 Scott Tester at 77° F. and 55% relative humidity. The rate of jaw separation was 20 inches/minute. (ASTM D-412-41.)

The results show that about 2 to 4, or slightly more, percent of high molecular weight polyethylene improves the processing properties of the high molecular weight polybutylene. At 10 percent polyethylene, however, the improved properties are not obtained.

A sample of high molecular weight polyisobutylene (Enjay Company No. MD-331, having a Staudinger molecular weight of 200,000) was milled in a rubber mill for 15 minutes with 20 pounds' steam pressure. Although the product formed a sheet in the mill, on removal of the polymer film from the mill it tended to break up due to lack of strength.

Another sample was made by milling another portion of MD-331 polyisobutylene with 4% by weight of high-pressure type polyethylene (Bakelite DYNJ) having a density of 0.92 and containing 2.3 methyl branches per 100 carbon atoms. This sample was milled in the rubber mill for 15 minutes with 20-40 pounds' steam pressure and as the mixture had little strength it would not form a film on or off the mill.

Where a sample was made by milling polyisobutylene MD-331 with 4% by weight of a commercial "low-pressure" high-density polyethylene (Bakelite DMDA) in the rubber mill for 15 minutes at 20-40 pounds steam pressure, a very smooth film was formed which lacked the nerve of straight polyisobutylene and had considerable tear strength.

This application is a continuation-in-part of my copending application Serial No. 600,658, filed July 30, 1956, now abandoned.

I claim:

1. Polymers consisting essentially of rubber-like polyisobutylene of a molecular weight of at least about 100,000 containing in admixture therewith about 1.5 to 4.5 weight percent based on the total composition of highly crystalline, low-pressure, linear polyethylene of a molecular weight of at least about 20,000 to one million and a density of about 0.94 to 0.97 made by polymerizing ethylene at a pressure not exceeding about 1,000 p.s.i.

2. Polymers consisting essentially of rubber-like polyisobutylene having a molecular weight of at least about 180,000 containing in admixture therewith about 1.5 to 4.5 weight percent based on the total composition of highly crystalline, low-pressure, linear polyethylene of a molecular weight of at least about 30,000 to 300,000 and a density of about 0.94 to 0.97 made by polymerizing ethylene at a pressure not exceeding about 1,000 p.s.i.

3. The method of producing mixtures of polyisobutylene and polyethylene which comprises dissolving rubber-like polyisobutylene having a molecular weight of at least about 100,000 in an inert organic liquid solvent, adding a catalyst comprising an alkyl aluminum in combination with a titanium halide and contacting the solution with ethylene while maintaining a temperature of about −50° to 350° C. and a pressure of not more than about 1,000 p.s.i. for a time sufficient to produce about 1 to 4.5 parts by weight of a polymer of ethylene for every 99 to 95.5 parts by weight of polyisobutylene, the catalyst being effective to catalyze the polymerization of ethylene under said temperature and pressure conditions.

4. The method of claim 3 in which the catalyst is a combination of aluminum triethyl and titanium tetrachloride.

References Cited in the file of this patent

UNITED STATES PATENTS

| 2,369,471 | Latham | Feb. 13, 1945 |
| 2,414,300 | Hamilton | Jan. 14, 1947 |
| 2,542,771 | Hanford et al. | Feb. 20, 1951 |
| 2,725,374 | Mosher | Nov. 29, 1955 |
| 2,788,340 | Dannels | Apr. 29, 1957 |
| 2,816,883 | Larchar et al. | Dec. 17, 1957 |

FOREIGN PATENTS

| 533,362 | Belgium | May 16, 1955 |

OTHER REFERENCES

Schildknecht: "Polymer Processes," page 230, Interscience, New York (1956).

Hines et al.: "Industrial Eng. Chem.," 49, 1071-1074, July 1957.